United States Patent Office 3,330,642
Patented July 11, 1967

3,330,642
AGRICULTURAL CHEMICAL CONCENTRATES
Joseph E. Barron, Stratford, and Adam Soboleski, Naugatuck, Conn., assignors to United States Rubber Company, New York, N.Y., a corporation of New Jersey
No Drawing. Filed Feb. 14, 1964, Ser. No. 344,833
3 Claims. (Cl. 71—100)

This invention relates to agricultural chemical concentrates which are single phase liquid solutions of sodium N-1-naphthyl phthalamate and carbamate esters.

Sodium N-1-naphthyl phthalamate is a known water-soluble plant growth regulant and herbicide. Various carbamate esters which are oil-soluble are known herbicides and insecticides. It is desired to formulate mixtures of sodium N-1-naphthyl phthalamate and such carbamate esters in the form of a single phase liquid concentrate that will remain as a single phase liquid solution during storage and until dilution for ultimate agricultural chemical use.

We have found that such a single phase liquid solution of a mixture of sodium N-1-naphthyl phthalamate and a carbamate ester will be produced if the concentration of sodium N-1-naphthyl phthalamate in the solution is 15% to 35%, the amount of carbamate ester is ⅕ to 2 parts per part of the sodium N-1-naphthyl phthalamate, and the solution contains 25% to 65% of a mixture of water, xylene and a butyl alcohol (n-butyl, sec-butyl or isobutyl alcohol) in ratios of 10 to 100 parts of the xylene per 100 parts of the water and 10 to 120 parts of the butyl alcohol per 100 parts of the water. Such a single phase solution will separate into aqueous and oil phases on dilution with water for ultimate use, e.g. as an agricultural chemical spray. Therefore, there is optionally included in the formulation up to 15% (preferably 5% to 15%) by weight of the formulation of a surface-active dispersing agent. Such surface-active dispersing agent will emulsify the oil phase of the composition when the concentrate is diluted for use. It is wholly surprising and unforseen that an aqueous solution of sodium N-1-naphthyl phthalamate would be a good solvent for carbamate esters dissolved in xylene and a butyl alcohol, and that a single phase liquid solution would result.

The xylene may be in the form of a commercial xylene, or solvent naphtha (e.g. ASTM Designation D838-50) which are mixtures of ortho-, meta-, and para-xylenes.

Sodium N-1-naphthyl phthalamate is the sodium salt of N-1-naphthyl phthalamic acid having the following formula:

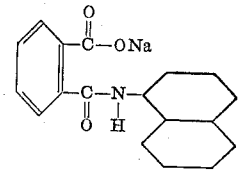

Examples of carbamate ester herbicides are: 2,3-dichloroallyl N,N-diisopropylthiolcarbamate

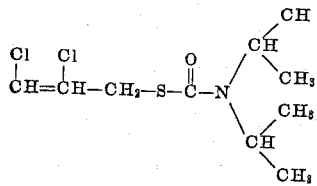

4-chloro-2-butynyl N(3-chlorophenyl)carbamate

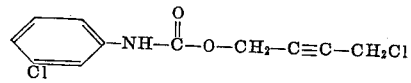

2-(3-butynyl) N-(3-chlorophenyl)carbamate

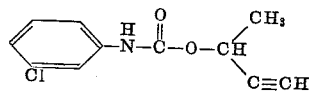

2-(3-butynyl) N-(phenyl)carbamate

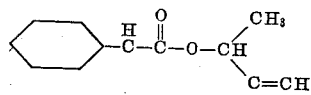

isopropyl N-(3-chlorophenyl) carbamate

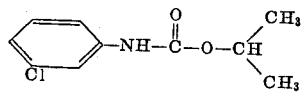

ethyl N,N-di-n-propylthiolcarbamate

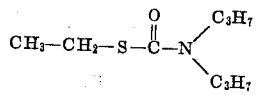

isopropyl N-phenylcarbamate

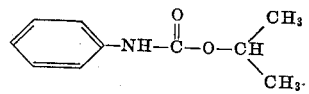

methyl N-(3,4-dichlorophenyl) carbamate

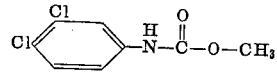

n-propyl N-ethyl-N-(n-butyl) thiolcarbamate

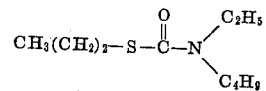

2-chloroallyl N,N-diethyldithiocarbamate

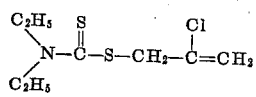

Examples of carbamate ester insecticides are:

4-(methylthio)3,5-xylyl N-methylcarbamate

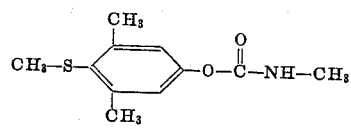

2-isopropoxyphenyl N-methylcarbamate

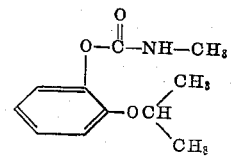

4-dimethylamino-3-tolyl N-methylcarbamate

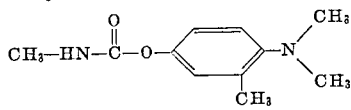

which is a sodium alkyl aryl sulfonate sold under the trade name Atlox 3300 (first column) and without a surface-active dispersing agent (second column). The third column gives the parts of butyl alcohol and xylene per 100 parts of water. The fourth column gives the parts of carbamate ester per part of the sodium N-1-naphthyl phthalamate.

|  | Formulation with surface-active dispersing agent. (Parts) | Formulation without surface-active dispersing agent. (Parts) | Parts of butyl alcohol and xylene per 100 parts of water | Parts of carbamate ester per part of sodium N-1-naphthyl phthalamate |
|---|---|---|---|---|
| Example 1: |  |  |  |  |
| Sodium N-1-naphthyl phthalamate | 25 | 28 |  |  |
| 4-chloro-2-butynyl N-(3-chlorophenyl) carbamate | 15 | 16.5 |  | 0.6 |
| Isobutyl alcohol | 13 | 14.5 | 48 |  |
| Xylene | 10 | 11 | 37 |  |
| Atlox 3300 | 10 |  |  |  |
| Water | 27 | 30 |  |  |
| Example 2: |  |  |  |  |
| Sodium N-1-naphthyl phthalamate | 28 | 31.2 |  |  |
| 2-(3-butynyl) N-phenyl carbamate | 6 | 6.7 |  | 0.2 |
| Isobutyl alcohol | 23.5 | 26 | 104 |  |
| Xylene | 10 | 11.1 | 44 |  |
| Atlox 3300 | 10 |  |  |  |
| Water | 22.5 | 25 |  |  |
| Example 3: |  |  |  |  |
| Sodium N-1-naphthyl phthalamate | 23 | 25 |  |  |
| 2-(3-butynyl) N-(3-chlorophenyl) carbamate | 40.5 | 44 |  | 1.8 |
| Isobutyl alcohol | 3.5 | 4 | 16 |  |
| Xylene | 3.5 | 4 | 16 |  |
| Atlox 3300 | 8.5 |  |  |  |
| Water | 21 | 23 |  |  |
| Example 4: |  |  |  |  |
| Sodium N-1-naphthyl phthalamate | 17.5 | 19.5 |  |  |
| Isopropyl N-(3-chlorophenyl) carbamate | 22.5 | 25 |  | 1.3 |
| Isobutyl alcohol | 18.5 | 20.5 | 110 |  |
| Xylene | 15 | 16.5 | 90 |  |
| Atlox 3300 | 10 |  |  |  |
| Water | 16.5 | 18.5 |  |  |
| Example 5: |  |  |  |  |
| Sodium N-1-naphthyl phthalamate | 25 | 27.5 |  |  |
| 2-(3-butynyl) N-(3-chlorophenyl) carbamate | 14 | 50.5 |  | 0.55 |
| n-Butyl alcohol | 4.5 | 5 | 10.5 |  |
| Xylene | 4.5 | 5 | 10.5 |  |
| Atlox 3300 | 9 |  |  |  |
| Water | 43 | 47 |  |  |

2-(N,N-dimethylcarbamyl)-3-methylpyrazolyl-5 N,N-dimethylcarbamate

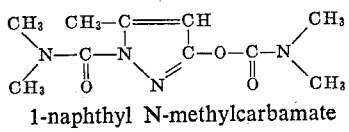

1-naphthyl N-methylcarbamate

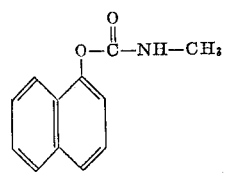

4-(N,N-dimethylamino)-3,5-xylyl N-methylcarbamate

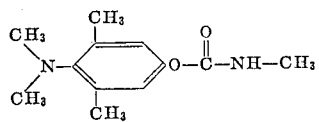

The surface-active dispersing agents that may be used in the compositions of the present invention may be anionic or non-ionic or cationic surface-active agents. Such surface-active agents are well known and reference is made to U.S. Patent 2,556,665, issued June 12, 1951, columns 3 and 4, for detailed examples of the same.

The examples below illustrate the invention. All parts and percentages used herein are by weight.

The following table gives the formulations for Examples 1 to 5, with a surface-active dispersing agent Each of the compositions of Examples 1 to 5 are single phase liquid solutions.

In further examples, each of the other herbicidal and insecticidal carbamate esters listed above are substituted for the illustrative carbamate ester used in each of Examples 1 to 5.

In view of the many changes and modifications that may be made without departing from the principles underlying the invention, reference should be made to the appended claims for an understanding of the scope of the protection afforded the invention.

Having thus described our invention, what we desire to protect by Letters Patent is:

1. A herbicidal or plant growth regulant concentrate which comprises, as a single phase liquid solution: 15 to 35% by weight of sodium N-1-naphthyl phthalamate; 1/5 to 2 parts by weight of a carbamate ester per part of sodium N-1-naphthyl phthalamate, said carbamate ester being 2,3-dichloroallyl N,N-diisopropylthiolcarbamate, 4-chloro-2-butynyl N-(3-chlorophenyl)carbamate, 2-(3-butynyl) N - (3-chlorophenyl)carbamate, 2-(3-butynyl) N-phenylcarbamate, isopropyl N-(3-chlorophenyl)carbamate, ethyl N,N-di-n-propylthiolcarbamate, isopropyl N-phenylcarbamate, methyl N-(3,4-dichlorophenyl)carbamate, n-propyl N - ethyl-N-(n-butyl)thiolcarbamate, 2-chloroallyl N,N-diethyldithiocarbamate, 4-(methylthio)-3,5-xylyl N-methylcarbamate, 2-isopropoxyphenyl N-methylcarbamate, 4 - dimethylamino-3-tolyl N-methylcarbamate, 2-(N,N - dimethylcarbamyl)3 - methylpyrazolyl-5 N,N-dimethylcarbamate, 1-naphthyl N-methylcarbamate, or 4 - (N,N-dimethylamino)-3,5-xylyl N-methylcarbamate; and 25% to 65% by weight of a mixture of water, xylene and n-butyl, sec. butyl or isobutyl alcohol, said mixture containing, per 100 parts of water, 10 to 100 parts by weight of xylene and 10 to 120 parts by weight of butyl alcohol.

2. The herbicidal or plant growth regulant concentrate of claim 1 in which the single phase liquid solution contains 5 to 15% by weight of a surface active dispersing agent.

3. The herbicidal or plant growth regulant concentrate of claim 1 wherein the carbamate ester is isopropyl N-(3-chlorophenyl)carbamate.

References Cited

UNITED STATES PATENTS 2,558,762 7/1951 Kohr.
3,116,995 7/1964 Willard et al. _____ 71—2.6

FOREIGN PATENTS 546,849 10/1957 Canada.

LEWIS GOTTS, *Primary Examiner.*

JAMES O. THOMAS, JR., ELBERT L. ROBERTS, *Examiners.*

ALBERT J. ADAMCIK, *Assistant Examiner.*